US011645857B2

(12) United States Patent
Zeng et al.

(10) Patent No.: US 11,645,857 B2
(45) Date of Patent: May 9, 2023

(54) LICENSE PLATE NUMBER RECOGNITION METHOD AND DEVICE, ELECTRONIC DEVICE AND STORAGE MEDIUM

(71) Applicant: Shenzhen Intellifusion Technologies Co., Ltd., Guangdong (CN)

(72) Inventors: Zhuoxi Zeng, Guangdong (CN); Wenze Hu, Guangdong (CN); Xiaoyu Wang, Guangdong (CN)

(73) Assignee: Shenzhen Intellifusion Technologies Co., Ltd., Guangdong (CN)

( * ) Notice: Subject to any disclaimer, the term of this patent is extended or adjusted under 35 U.S.C. 154(b) by 0 days.

(21) Appl. No.: 17/623,903

(22) PCT Filed: Oct. 27, 2020

(86) PCT No.: PCT/CN2020/124085
§ 371 (c)(1),
(2) Date: Dec. 30, 2021

(87) PCT Pub. No.: WO2021/103897
PCT Pub. Date: Jun. 3, 2021

(65) Prior Publication Data
US 2022/0319204 A1    Oct. 6, 2022

(30) Foreign Application Priority Data
Nov. 29, 2019   (CN) .......................... 201911207033.2

(51) Int. Cl.
*G06V 20/62*      (2022.01)
*G06V 10/32*      (2022.01)
(Continued)

(52) U.S. Cl.
CPC ............ *G06V 20/625* (2022.01); *G06V 10/32* (2022.01); *G06V 10/82* (2022.01); *G06V 30/12* (2022.01);
(Continued)

(58) Field of Classification Search
CPC ...... G06V 20/625; G06V 10/32; G06V 10/82; G06V 30/12; G06V 30/146; G06V 30/18105; G06V 30/1916
See application file for complete search history.

(56) References Cited

U.S. PATENT DOCUMENTS 10,795,933 B1 * 10/2020 Langley .............. G06F 16/7837
10,963,719 B1 *  3/2021 Hantehzadeh ......... G06V 10/24
(Continued)

FOREIGN PATENT DOCUMENTS

CN          109784186 A       5/2019

*Primary Examiner* — Xuemei G Chen

(57) ABSTRACT

A license plate number recognition method includes: extracting license plate number features of an image to be recognized including a license plate number, through a pre-trained convolutional neural network; extracting an intermediate convolution result during extracting the license plate number features, and extracting a first verification feature and/or a second verification feature according to the intermediate convolution result; verifying whether the license plate number features are correct according to the first and/or second verification features; if correct, outputting a predicted license plate number result according to the license plate number features. During the feature extraction process of the license plate number features, an intermediate feature is extracted as a verification feature to verify whether the extracted license plate number features are correct, and only when the verification is passed, outputting the license plate number result, which reduces the output error rate of the license plate number recognition result.

13 Claims, 8 Drawing Sheets

(51) Int. Cl.
  *G06V 30/18*   (2022.01)
  *G06V 30/146*  (2022.01)
  *G06V 10/82*   (2022.01)
  *G06V 30/12*   (2022.01)
  *G06V 30/19*   (2022.01)

(52) U.S. Cl.
  CPC ...... *G06V 30/146* (2022.01); *G06V 30/18105* (2022.01); *G06V 30/1916* (2022.01)

(56) References Cited

U.S. PATENT DOCUMENTS

| | | | |
|---|---|---|---|
| 2014/0207763 A1* | 7/2014 | Vadrevu | G06F 16/288 |
| | | | 707/723 |
| 2017/0124428 A1* | 5/2017 | Han | G06F 21/32 |
| 2020/0034647 A1* | 1/2020 | Snell | G06N 3/08 |
| 2020/0074211 A1* | 3/2020 | Georgis | G06V 30/153 |
| 2020/0125706 A1* | 4/2020 | Adir | H04L 9/3231 |
| 2020/0134366 A1* | 4/2020 | Xu | G06V 10/48 |
| 2020/0193232 A1* | 6/2020 | Wang | G06K 9/6257 |
| 2020/0202542 A1* | 6/2020 | Takhirov | G06V 10/82 |
| 2020/0242451 A1* | 7/2020 | Cao | G06N 3/0454 |
| 2020/0364829 A1* | 11/2020 | Ahn | G06T 3/4046 |
| 2021/0092280 A1* | 3/2021 | Nishimura | G06V 10/82 |
| 2021/0142091 A1* | 5/2021 | Kampel | G06V 10/255 |
| 2021/0150247 A1* | 5/2021 | Kuo | G06V 30/19173 |
| 2021/0150746 A1* | 5/2021 | Kang | G06T 7/593 |
| 2021/0150752 A1* | 5/2021 | Ayvaci | G06N 3/08 |
| 2021/0158540 A1* | 5/2021 | Hibi | G06K 9/6256 |

\* cited by examiner

LICENSE PLATE NUMBER RECOGNITION METHOD AND DEVICE, ELECTRONIC DEVICE AND STORAGE MEDIUM

CROSS REFERENCE TO RELATED APPLICATIONS

This application is a national phase entry under 35 U.S.C. § 371 of International Application No. PCT/CN2020/124085, filed on Oct. 27, 2020, which claims priority to Chinese Patent Application No. 201911207033.2, filed on Nov. 29, 2019, the entire contents of all of which are incorporated herein by reference.

BACKGROUND

1. Technical Field

The present disclosure generally relates to the technical field of artificial intelligence, in particular to a license plate number recognition method and a device, an electronic equipment and a storage medium.

2. Description of Related Art

Image recognition is commonly used in current traffic, community or parking lot management, such as: license plate number recognition based on an image recognition technology. Currently, the conventional license plate number recognition is generally divided into a plurality of independent steps, such as: 1. Performing image normalization: a license plate image is programmed into a formal image through a computer vision method (such as a homography matrix etc.); 2. Pre-processing images: processing image shading, image dirt and image illumination (such as binarized); 3. Character segmentation: performing character segmentation (such as edge detection etc.) by the computer vision method; 4. Character recognition: recognizing the characters that have been segmented (such as random forest, support vector machine (SVM), logistic regression and other machine learning or deep learning methods), in this way, errors occurring in each step may be accumulated, which results in a poor final recognition effect and being difficult to determine in which step the problem is occurred. In addition, the conventional license plate recognition has relatively high requirements on input images, and has strict requirements on angles and definitions. Various limitations of the conventional license plate recognition lead to strict requirements on installing cameras and monitoring scenes, so that a recognition rate is easily affected by weather, light and so on. Therefore, in the conventional license plate number recognition, once recognition errors are occurred, wrong recognition results will be output, so that a high output error rate is occurred, at the same time, no verification mechanisms are provided so that the recognition result usually needs to be verified manually.

SUMMARY

The technical problems to be solved: in view of the shortcomings of the related art, the present disclosure provides a license plate number recognition method which can reduce an error rate of recognizing a license plate number.

In a first aspect, a license plate number recognition method according to an embodiment of the present disclosure includes:

extracting a license plate number feature of an image to be recognized through a pre-trained convolutional neural network, the image to be recognized including a license plate number;

extracting an intermediate convolution result, during extracting the license plate number feature, and extracting a first verification feature and/or a second verification feature, according to the intermediate convolution result;

verifying whether the license plate number feature is correct, according to the first verification feature and/or the first verification feature; and if the license plate number feature is correct, outputting a predicted license plate number result, according to the license plate number feature.

Optionally, the pre-trained convolutional neural network includes a first convolutional network and a second convolutional network, and the step of extracting the license plate number feature of the image to be recognized through the pre-trained convolutional neural network, includes:

correcting the image to be recognized through a spatial transformation network, to obtain the image to be recognized that has been corrected;

sequentially performing feature extraction on the image to be recognized that has been corrected through a first convolutional network and a second convolutional network, to sequentially obtain a first feature and a second feature with the same size, accordingly; and obtaining the license plate number feature based on the first feature and the second feature.

Optionally, the first convolutional network includes a first convolution layer, a second convolution layer, a third convolution layer, a first down-sampling layer, a second down-sampling layer, a third down-sampling layer, and a fourth down-sampling layer, and the second convolutional network includes a fourth convolution layer, inputs of the first down-sampling layer and the second down-sampling layer respectively connected to an output of a first convolution region, the step of sequentially performing feature extraction on the image to be recognized that has been corrected through a first convolutional network and a second convolutional network, to sequentially obtain a first feature and a second feature with the same size, accordingly, including:

performing feature extraction on the image to be recognized that has been corrected through the first convolution layer, and performing down-sampling on a first convolution result through the first down-sampling layer, to obtain the first feature according with a target size;

performing down-sampling on the first convolution result through the fourth down-sampling layer, performing feature extraction on a fourth down-sampling result through the second convolution layer, and performing down-sampling on a second convolution result through the second down-sampling layer, to obtain a third feature according with the target size;

performing down-sampling on the second convolution result through the third down-sampling layer, to obtain a third down-sampling result according with the target size, performing feature extraction on the third down-sampling result through the third convolution layer, to obtain a fourth feature based on a third convolution result;

performing feature extraction on the fourth feature through a fourth convolutional network, to obtain the second feature based on a fourth convolution result; and wherein the target size is a size of the second feature.

Optionally, the step of obtaining the license plate number feature based on the first feature and the second feature, includes:

stacking the first feature, the second feature, the third feature and the fourth feature on a channel dimension, to obtain the license plate number feature.

Optionally, the intermediate convolution result includes at least one of the first convolution result, the second convolution result, the third convolution result, and the fourth convolution result, wherein the step of extracting the intermediate convolution result during extracting the license plate number feature, and extracting the first verification feature and/or the second verification feature, according to the intermediate convolution result, includes:

inputting any one of the first convolution result, the second convolution result and the third convolution result into a first verification network, to extract the first verification feature; and/or extracting the second verification feature, according to the fourth convolution result.

Optionally, the first verification feature is a color feature, and the step of verifying the license plate number feature, according to the first verification feature, includes:

recognizing the first verification feature, to determine a color type of the first verification feature;

predicting the license plate number feature, to determine a license plate type of the license plate number;

determining the color type of the license plate number, according to the license plate type of the license plate number;

determining whether the color type of the first verification feature is the same as that of the license plate number;

if the color type of the first verification feature is the same as that of the license plate number, a verification result is passed; and if the color type of the first verification feature is different from that of the license plate number, the verification result is failed.

Optionally, the image to be recognized includes aspect ratio information of license plates, the second verification feature is a size feature, and the step of verifying the license plate number feature, according to the second verification feature, includes:

recognizing the second verification feature, to determine a size parameter corresponding to the second verification feature, and calculating a verification aspect ratio of the second verification feature, according to the size parameter;

determining whether the verification aspect ratio of the second verification feature is the same as the aspect ratio of the license plate included in the image to be recognized;

if the verification aspect ratio of the second verification feature is the same as the aspect ratio of the license plate included in the image to be recognized, the verification result is passed; and if the verification aspect ratio of the second verification feature is different from the aspect ratio of the license plate included in the image to be recognized, the verification result is failed.

In a second aspect, a license plate number recognition device according to an embodiment of the present disclosure includes:

a first extraction module configured to extract a license plate number feature of an image to be recognized through a pre-trained convolutional neural network, the image to be recognized including a license plate number;

a second extraction module configured to extract an intermediate convolution result during extracting the license plate number feature, and extract a first verification feature and/or a second verification feature, according to the intermediate convolution result;

a verification module configured to verify whether the license plate number feature is correct, according to the first verification feature and/or the first verification feature; and an output module configured to output a predicted license plate number result, according to the license plate number feature, if the license plate number feature is correct.

In a third aspect, an electronic device according to an embodiment of the present disclosure includes a memory, a processor and computer programs stored in the memory and performed by the processor to implement steps of the license plate number recognition method mentioned above.

In a fourth aspect, a computer readable storage medium according to an embodiment of the present disclosure is configured to store computer programs performed by a processor to implement steps of the license plate number recognition method mentioned above.

In the embodiment of the present disclosure, the license plate number feature of the image to be recognized is extracted through the pre-trained convolutional neural network, the image to be recognized including the license plate number; in the process of extracting the license plate number feature, extracting the first verification feature and/or the second verification feature, according to the intermediate convolution result; verifying whether the license plate number feature is correct, according to the first verification feature and/or the second verification feature; and if the license plate number feature is correct, outputting the license plate number result that has been predicted according to the license plate number feature. In the process of performing feature extraction on the license plate number feature, an intermediate feature is extracted as the verification feature, to verify whether the extracted license plate number feature is correct, and the license plate number result is output only when the verification is passed, in this way, an output error rate of the license plate number recognition result can be reduced.

BRIEF DESCRIPTION OF THE DRAWINGS

In order to more clearly understand the technical solution hereinafter in embodiments of the present disclosure, a brief description to the drawings used in detailed description of embodiments hereinafter is provided thereof. Obviously, the drawings described below are some embodiments of the present disclosure, for one of ordinary skill in the related art, other drawings can be obtained according to the drawings below on the premise of no creative work.

DETAILED DESCRIPTION

Reference will now be made in detail to embodiments, examples of which are illustrated in the accompanying drawings. In the following detailed description, numerous specific details are set forth in order to provide a thorough understanding of the subject matter presented herein. Obviously, the implementation embodiment in the description is a part of the present disclosure implementation examples, rather than the implementation of all embodiments, examples. According to the described embodiment of the present disclosure, all other embodiments obtained by one of ordinary skill in the related art on the premise of no creative work are within the protection scope of the present disclosure.

Figure 1:
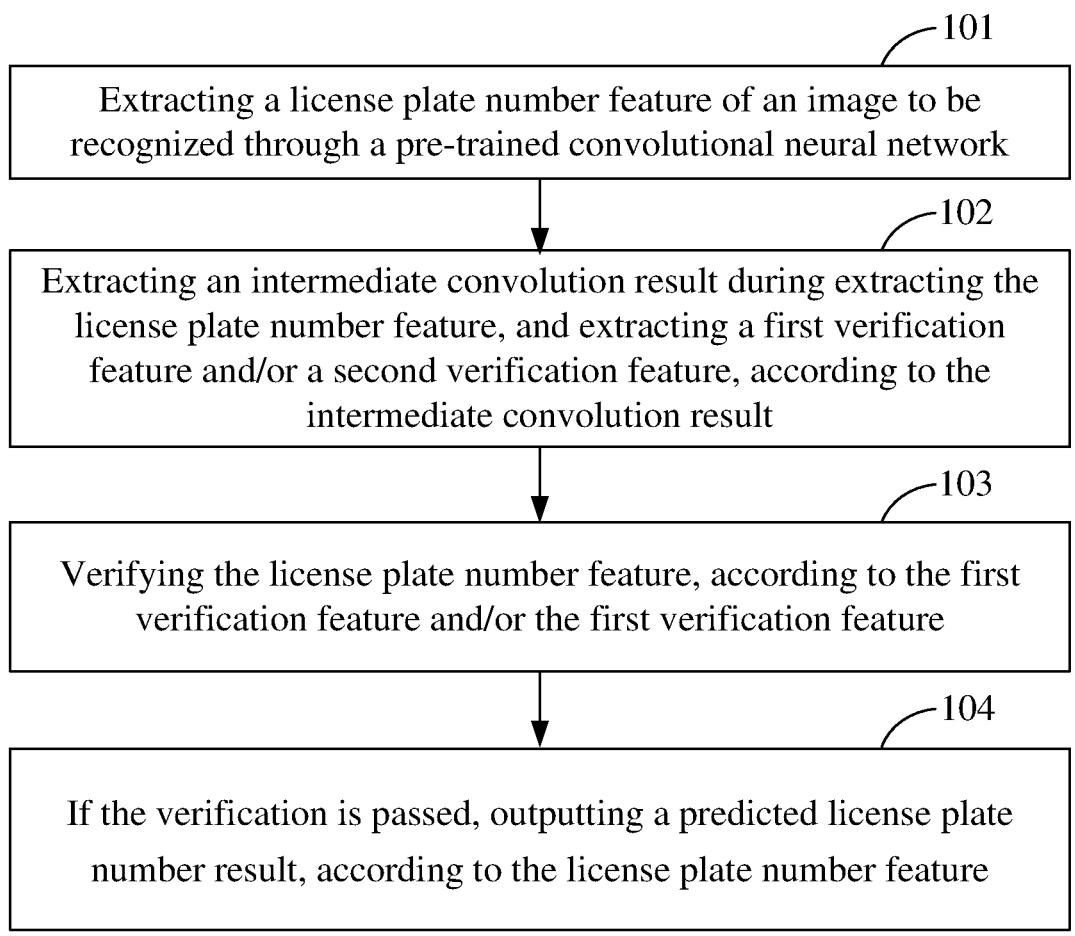
FIG. 1 is a flowchart of a license plate number recognition method in accordance with an embodiment of the present disclosure.

Referring to FIG. 1, a flowchart of a license plate number recognition method in accordance with an embodiment of the present disclosure is provided, the method includes the following steps:

step 101, extracting a license plate number feature of an image to be recognized through a pre-trained convolutional neural network.

In the step 101, the image to be recognized can include a license plate number and a license plate parameter. The image to be recognized can be a still image or an image frame of dynamic videos of a vehicle license plate uploaded by a user, or acquired by a camera arranged on a traffic road, a community entrance or a parking lot entrance. The license plate parameter includes size parameters such as a height and a width of the license plate.

The license plate numbers in the image to be recognized can be one or more, that is, there are one or more license plate numbers to be recognized in the image to be recognized.

The pre-trained convolutional neural network includes a convolution layer (cony block), a down-sampling (down sample) layer and a fully connected layer (FC), etc. The convolution layer includes an input layer (input), an activation layer (relu), a batch normalization layer (batch norm) and a convolution calculation layer (cony), etc. In the convolution calculation layer, an output after performing convolution calculation on the convolution calculation layer is added to an input of the convolution calculation layer to make image information redundant and improve a convergence speed of network training. A next convolution calculation layer can select contents after performing convolution calculation or contents without performing convolution calculation as an input of the next convolution calculation layer for calculation. The down-sampling layer, called as a pooling layer, can reduce a size of an image by sampling pixels of the image, to obtain a larger receptive field. The fully connected layer connects all convoluted channels, to obtain an overall feature representation.

Inputting the image to be recognized into a convolutional neural network, and sequentially performing convolution calculation on the image to be recognized through each convolution layer in the convolutional neural network, to extract the license plate number feature of the image to be recognized.

In addition, before inputting the image to be recognized into the convolution layer, the image can be pre-processed, which includes image normalization, image size transformation and image correction, etc.

In a possible implementation, a spatial transformation network, such as STN (spatial transformation network), is preceded in the convolutional neural network, and the image to be recognized can be spatially transformed so as to satisfy input expectation of the convolution layer.

step 102, extracting an intermediate convolution result during extracting the license plate number feature, and extracting a first verification feature and/or a second verification feature, according to the intermediate convolution result.

In the step 102, the above process of extracting the license plate number feature can be regarded as a convolution process of performing convolution calculation on the image to be recognized in the convolutional neural network. In the convolutional neural network, each convolution layer corresponds to a convolution result, specifically, each convolution calculation layer corresponds to the convolution result. In the convolutional neural network, the convolution calculation process is a process of calculating an input matrix through convolution kernels, the input matrix can be regarded as a pixel matrix of the image to be recognized, or a feature point matrix in a feature image. The feature image is an image that has been obtained by performing convolution calculation on the image to be recognized. Specifically, channels with the same number as the convolution kernels are generated after performing convolution calculation on the image to be recognized through the convolution kernels, and a corresponding feature image can be obtained by adding the channels. In one way of understanding, the channels can also be called as feature images.

The first verification feature and the second verification feature are different verification features, which can be a license plate color, a license plate size, a character color and other features based on the license plate structure itself. Structural parameters of the license plate are standardized, which can be used as a priori information to verify the license plate number.

The intermediate convolution result is a convolution result that is output by the output of each convolution layer during performing feature extraction on the image to be recognized in the convolutional neural network. It should be noted that, because a plurality of convolution layers is included in the convolutional neural network, the first verification feature and the second convolution feature can be convolution results of any one of the plurality of convolution layers.

step 103, verifying the license plate number feature, according to the first verification feature and/or the first verification feature.

In the step 103, the first verification feature is different from the second verification feature, which can be the license plate color, the license plate size, the character color and other features based on the license plate structure itself. The license plate number can be verified by using the license plate color, the license plate size and the character color as priori information for license plate number verification.

Optionally, the first verification feature is a color feature, and in the process of recognizing the image to be recognized by the convolutional neural network, any intermediate convolution result calculated by an intermediate convolution layer is extracted as the first verification feature. Performing feature recognition on the extracted intermediate convolution result through a branch network, to recognize the first verification feature and determine a color type of the first verification feature; predicting the license plate number feature, to determine a license plate type of the license plate number; determining the color type of the license plate number, according to the license plate type of the license plate number; determining whether the color type of the first verification feature is the same as that of the license plate number; if the color type of the first verification feature is the same as that of the license plate number, a verification result is passed; and if the color type of the first verification feature is different from that of the license plate number, the verification result is failed. For example, the license plate includes license plate recognition characters and license plate colors. The license plate recognition characters include: Chinese characters with an abbreviation of provinces, autonomous regions and municipalities directly under the central government, capital letter identifications of licensing authority codes, and capital letters/number identifications of serial numbers. In addition, Chinese character identifications of attributes of vehicles can also be included, such as a "police" character follows a serial number of a police vehicle, and a "learning" character is following a serial number of a driving school training vehicle, etc. The license plate color refers to a background color of the license plate, including: blue (generally a household car license plate), yellow (a license plate for a large vehicle or an agricultural vehicle and a learner-driven vehicle), white (a license plate of a special vehicle, such as a military vehicle, a police vehicle and a racing vehicle), black (license plates of vehicles used by foreign businessmen and foreign enterprises or foreign vehicles), taking a civil license plate commonly used in China as an example, the license plate color is blue. When performing convolution calculation on an image of the license plate by the convolutional neural network, any convolution result can be selected from the intermediate convolution layer and then input into a color recognition branch network, to recognize the license plate color. A corresponding license plate number can be obtained by predicting the license plate number feature, and then searching a license plate color corresponding to the license plate number in a license plate number database, comparing the license plate color that has been recognized with the license plate color that has been searched in the license plate number database, to determine whether the recognized license plate color is the same as the searched license plate color. If the recognized license plate color is the same as the searched license plate color, that is, both the recognized license plate color and the searched license plate color are blue, which indicates that no errors are occurred in color recognition, and the verification is passed; if the recognized license plate color is different from the searched license plate color, that is, the license plate color that has been searched is not blue, which indicates that an error is occurred in the color recognition. Because the color is extracted in the recognition process, it can be considered that the error is occurred in the recognition process, and the verification is failed.

Optionally, the image to be recognized includes an aspect ratio of the license plate and the second verification feature is a size feature. The step of verifying whether the license plate number feature is correct, according to the second verification feature, can be: recognizing the second verification feature, to determine a size parameter corresponding to the second verification feature, and calculating a verification aspect ratio of the second verification feature, according to the size parameter; determining whether the verification aspect ratio of the second verification feature is the same as the aspect ratio of the license plate included in the image to be recognized; if the verification aspect ratio of the second verification feature is the same as the aspect ratio of the license plate included in the image to be recognized, the verification result is passed; and if the verification aspect ratio of the second verification feature is different from the aspect ratio of the license plate included in the image to be recognized, the verification result is failed. The aspect ratio of the license plate can be preset, when the second verification feature is extracted, the size feature corresponding to the aspect ratio is calculated, to obtain a corresponding recognition aspect ratio, and the recognition aspect ratio is compared with the preset aspect ratio of the license plate that has been preset, to determine whether the two aspect ratios are the same. In addition, the aspect ratio of the license plate can also be calculated, according to pixel coordinates of the license plate in the image to be recognized after the image to be recognized is input, and then is compared with the recognition aspect ratio, to determine whether the two aspect ratios are the same.

It should be noted that the first verification feature and the second verification feature can be configured to independently verify the license plate number feature, or combine with each other to verify the license plate number feature.

In a possible implementation, the license plate number feature can be verified by combining the first verification feature with the second verification feature. The first verification feature can be a background color of the license plate, and the second verification feature can be a character color. In a license plate color system, the background color of the license plate includes blue, yellow, white and black. Wherein: blue is the background color of a license plate of a household car (including a small-tonnage truck); yellow is the background color of a license plate of a large vehicle or an agricultural vehicle, a learner-driven vehicle, and new products of test vehicles, motorcycles without being finalized the design; white is the background color of the license plate of the special vehicle (such as the military vehicle, the police vehicle and the racing vehicle); black is the background color of the license plate of foreign businessmen and foreign enterprises, which is carried by a foreign country. The background color and the character color of the license plate are as follows: large-scale civil automobiles: black characters with a yellow background; small civil vehicles: white characters with a blue background; special vehicles for armed polices: a white background, red "WJ" characters and black characters; other foreign vehicles: white characters with a black background; foreign vehicles of embassies and consulates: white characters with a black background and a hollow "embassy" sign; testing vehicles: red characters with a white background, and a "trying" sign in front of the numbers; temporary license plates: red characters with a white background, and a "temporary" character in front of the numbers; replacement license plates of vehicles: black characters with a white background. Therefore, the license plate number feature can be verified by combining the license plate background color and the character color. Obtaining a recognized license plate color by recognizing the first verification feature, obtaining a recognized character color by recognizing the second verification feature, obtaining the license plate number by predicting the license plate number feature, searching the license plate color and the character color corresponding to the license plate number in the license plate number database, according to the license plate number, and comparing the license plate color and the character color with the recognized license plate color and the recognized character color, respectively, to determine a comparison result therebetween, so as to further determine whether the verification is passed.

It should be noted that, when the convolutional neural network is trained, the first verification feature and/or the second verification feature needs to be trained accordingly, so that the convolutional neural network can learn to extract the first verification feature and/or the second verification feature, and enough convolution kernels are occurred to extract the first verification feature and/or the second verification feature.

step 104, if the verification is passed, outputting a predicted license plate number result, according to the license plate number feature.

In the step 104, only a license plate number result corresponding to the license plate number feature that passes the verification can be output to be displayed. Thus, the output error rate of the license plate number recognition result can be reduced.

In a possible implementation, if the verification fails, the license plate number result and a corresponding abnormal prompt can be output, the abnormal prompt includes a verification record, for example, the prompt can be: "the color of the recognition result does not match, please note".

In another possible implementation, a plurality of parallel convolutional neural networks can be deployed to respectively recognize a plurality of images to be recognized, and are respectively trained by the same data set. The image to be recognized is transferred to another parallel convolutional neural network for performing secondary recognition under the condition that verification is failed, and if the license plate number results obtained by two times of recognition are the same, the image is output. If the license plate numbers obtained by the two times of recognition are different, outputting the license plate number results that pass the verification of the first verification feature and/or the second verification feature; and if the license plate numbers obtained by the two times of recognition are different, and the first verification feature and/or the second verification feature are not verified, outputting two license plate number results and corresponding abnormal prompts, the prompts including verification records in the two recognition processes.

In the embodiment of the present disclosure, the license plate number feature of the image to be recognized is extracted through the pre-trained convolutional neural network, the image to be recognized including the license plate number; in the process of extracting the license plate number feature, extracting the first verification feature and/or the second verification feature, according to the intermediate convolution result; verifying whether the license plate number feature is correct, according to the first verification feature and/or the second verification feature; and if the license plate number feature is correct, outputting the license plate number result that has been predicted, according to the license plate number feature. When performing feature extraction on the license plate number feature, an intermediate feature is extracted as a verification feature, to verify whether the license plate number feature that has been extracted is correct, and the license plate number result is output only when the verification is passed, in this way, the output error rate of the license plate number recognition result can be reduced.

It should be noted that the license plate number recognition method provided in the embodiment of the present disclosure can be applied to devices such as mobile phones, monitors, computers and servers that need to recognize license plate numbers.

Figure 2:
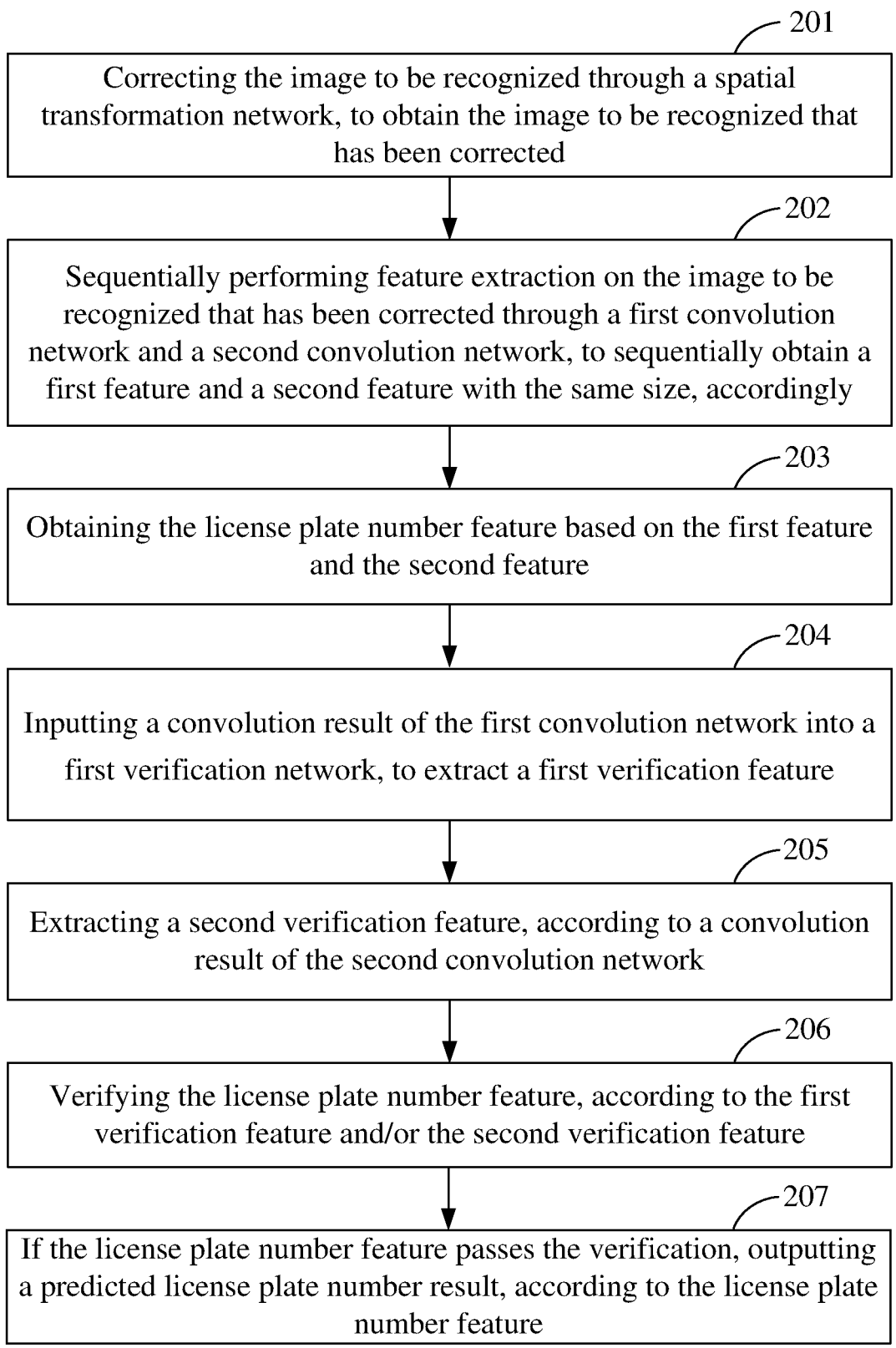
FIG. 2 is a flowchart of the license plate number recognition method in accordance with another embodiment of the present disclosure.

Optionally, referring to FIG. 2, a flowchart of the license plate number recognition method according to another embodiment of the present disclosure is shown, which is different from the embodiment of FIG. 1 is that, the pre-trained convolutional neural network includes a first convolutional network and a second convolutional network. The method includes the following steps:

step 201, correcting the image to be recognized through a spatial transformation network, to obtain the image to be recognized that has been corrected.

In the step 201, the above pre-trained spatial transformation network can be an STN (spatial transformation network) and set before the first convolutional network and the second convolutional network, to correct the image to be recognized, so that the image to be recognized can be corrected to be an input expected by the convolution layer. Meanwhile, the spatial transformation network can be arranged between the first convolutional network and the second convolutional network, to correct an input of a next convolutional network, so that an output of a previous convolutional network can be corrected to be an input expected by the next convolutional network. In addition, the first convolutional network and the second convolutional network include a plurality of convolution layers, and the spatial transformation network can also be set between the convolution layers to correct the input of the next convolution layer, so that the output of the previous convolution layer can be corrected to the input expected by the next convolution layer. The above correction process can be regarded as performing spatial transformation and alignment on the image to be recognized, which can include translation, scaling, and rotation of the image to be recognized. In this way, deployment requirements of image acquisition equipments can be reduced.

step 202, sequentially performing feature extraction on the image to be recognized that has been corrected through a first convolutional network and a second convolutional network, to sequentially obtain a first feature and a second feature with the same size, accordingly.

In the step 202, the first feature and the second feature mentioned above can be regarded as feature images after performing convolution calculation. The same size mentioned above refers to a size of the feature image. The above feature images with the same size, can be added conveniently.

The feature extraction is to perform convolution calculation on the image to be recognized, according to the convolution kernel that has been trained, to extract desired feature information. And according to a convolution result of the first convolutional network, performing down-sampling if necessary, to obtain the first feature, and obtaining the second feature according to the convolution result of the second convolutional network.

When a depth of the first convolutional network is smaller than a depth of the second convolutional network, the size of the feature image extracted by the first convolutional network can be larger than the size of the feature image extracted by the second convolutional network, at this time, the feature image extracted by the first convolutional network can be down-sampled, to obtain the feature image corresponding to the first feature, until the size of the feature image extracted by the first convolutional network is down-sampled to be the same as the size of the feature image extracted by the second convolutional network.

step 203, obtaining the license plate number feature based on the first feature and the second feature.

In the step 203, the license plate number feature is obtained by adding the first feature and the second feature. Adding the first feature to the second feature can be regards as adding their corresponding feature images, that is, adding corresponding feature points of the feature images.

The license plate number feature is obtained by adding the first feature and the second feature in a channel dimension.

Furthermore, the first convolutional network includes a first convolution layer, a second convolution layer, a third convolution layer, a first down-sampling layer, a second down-sampling layer, a third down-sampling layer, and a fourth down-sampling layer, and the second convolutional network includes a fourth convolution layer. Inputs of the first down-sampling layer and the second down-sampling layer are respectively connected to an output of a first convolution region. Specifically, performing feature extraction on the image to be recognized that has been corrected through the first convolution layer, and performing down-sampling on a first convolution result through the first down-sampling layer, to obtain the first feature according with a target size; performing down-sampling on the first convolution result through the fourth down-sampling layer, performing feature extraction on a fourth down-sampling result through the second convolution layer and performing down-sampling on a second convolution result through the second down-sampling layer, to obtain a third feature according with the target size; performing down-sampling on the second convolution result through the third down-sampling layer, to obtain a third down-sampling result according with the target size, and performing feature extraction on the third down-sampling result through the third convolution layer, to obtain a fourth feature based on a third convolution result; performing feature extraction on the fourth feature through a fourth convolutional network, to obtain the second feature based on a fourth convolution result; and wherein the target size is a size of the second feature.

The license plate number feature is obtained by adding the first feature, the second feature, the third feature and the fourth feature on the channel dimension.

step 204, inputting a convolution result of the first convolutional network into a first verification network, to extract a first verification feature.

In the step 204, the first verification network can be regarded as a branch network of the convolutional network, and specifically, the first verification network is parallel to the second convolutional network, and the convolution result of the first convolutional network is simultaneously input to the second convolutional network and the first verification network.

Furthermore, the first convolutional network includes the first convolution layer, the second convolution layer, the third convolution layer, the first down-sampling layer, the second down-sampling layer, the third down-sampling layer, and the fourth down-sampling layer, and the second convolutional network includes the fourth convolution layer. Inputs of the first down-sampling layer and the second down-sampling layer are respectively connected to the output of the first convolution region. The first convolution result, the second convolution result and the third convolution result are obtained by sequentially performing feature extraction on the image to be recognized that has been corrected through the first convolution layer, the second convolution layer and the third convolution layer. Inputting any one of the first convolution result, the second convolution result and the third convolution result into the first verification network, to extract the first verification feature.

It should be noted that the first convolutional network, the second convolutional network, and the first verification network all belong to the convolutional neural network, and can be trained through the same data set.

Optionally, the convolutional neural network is trained through a CTC loss (connection temporal classification loss), specifically, the first convolutional network and the second convolutional network are trained through the CTC loss, and the first verification network is trained through a cross entropy. Therefore, the first convolution network and the second convolution network can learn a time sequence classification to recognize the license plate number, according to the time sequence that has been learned, and the first verification network can learn a classification of the verification feature.

step 205, extracting a second verification feature, according to a convolution result of the second convolutional network.

Furthermore, on the basis of the step 204, the second verification feature is extracted according to the fourth convolution result.

In a possible implementation, the convolution result of the second convolution network is input into the second verification network, to extract the second verification feature. The second verification network can be regarded as the branch network of the convolutional network, and specifically, the second verification network is parallel to the second convolutional network, and the convolution result of the first convolutional network is simultaneously input to the second convolutional network and the second verification network. Similarly, the first convolutional network, the second convolutional network, and the first verification network all belong to the convolutional neural network, and can be trained through the same data set.

step 206, verifying the license plate number feature, according to the first verification feature and/or the second verification feature.

The step 206 is similar to the step 103 of FIG. 1, which is not repeated herein.

step 207, if the verification is passed, outputting a predicted license plate number result, according to the license plate number feature.

In the step 207, only the license plate number result corresponding to the license plate number feature that passes the verification is output to be displayed. Thus, the output error rate of the license plate number recognition result can be reduced.

In an embodiment of the present disclosure, the verification features are extracted through convolution results obtained by different network depths in the convolutional neural network, so that the verification feature and the license plate number feature can be extracted from the convolution result in one convolution neural, and the convolutional neural network is trained only by the same data set, thereby reducing difficulty of training the convolutional neural network and resources required by deployment.

Figure 3:
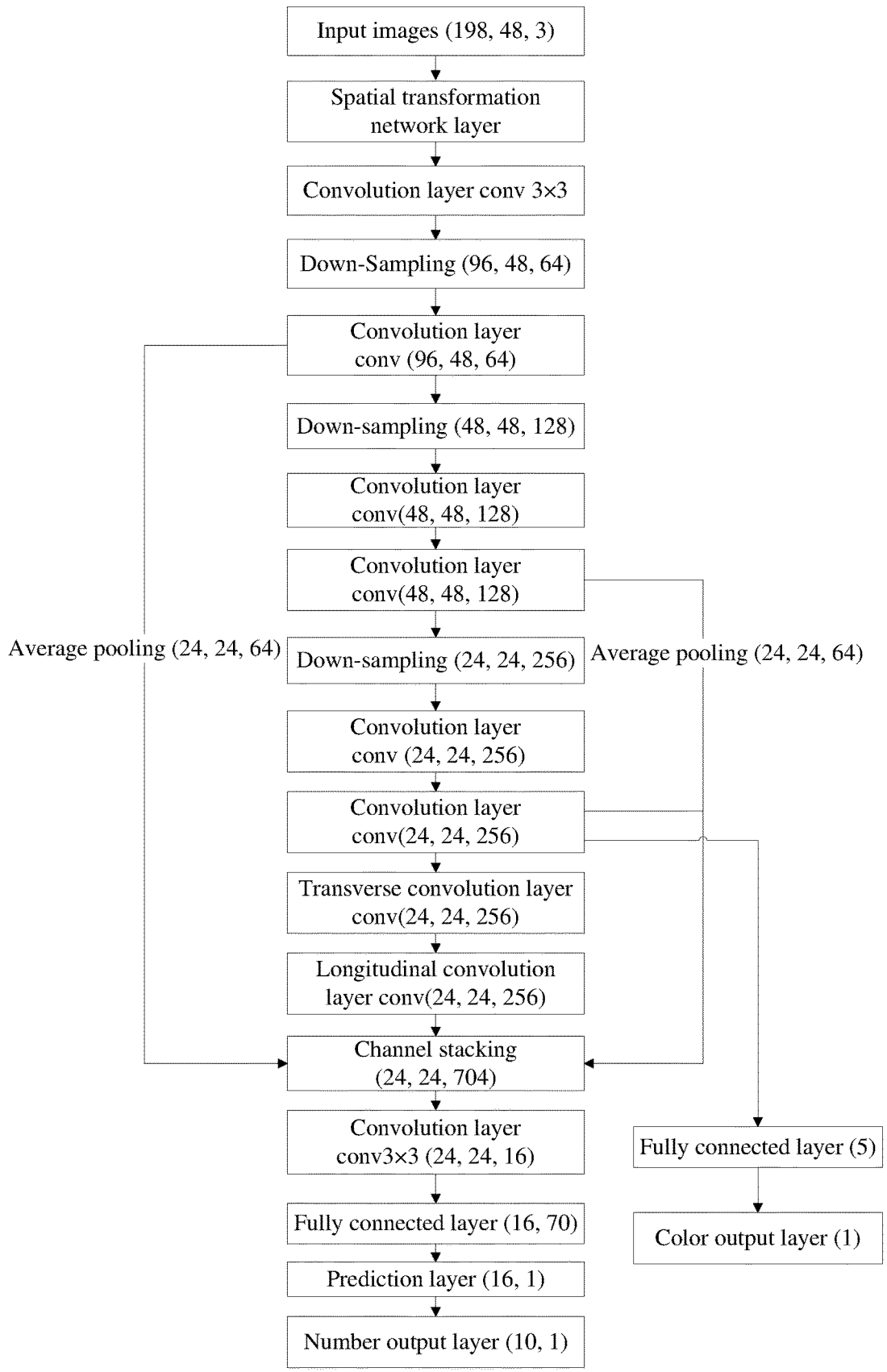
FIG. 3 is a flowchart of the license plate number recognition method in accordance with another embodiment of the present disclosure.

Referring to FIG. 3, a flowchart of the license plate number recognition method in accordance with another embodiment of the present disclosure is provided. The method includes the following steps:

inputting an image to be recognized, which is processed into an RGB image of (198, 48, 3).

Correcting the image to be recognized by a spatial transformation network layer. The image to be recognized that has been corrected is input into the convolution layer and convoluted through a 3×3 convolution kernel, to obtain a convolution result, and then performing down-sampling on the convolution result that has been obtained, to obtain a feature image of (96, 48, 64). Performing convolution calculation on the feature image of (96, 48, 64), to obtain a corresponding convolution result, and performing down-sampling on the corresponding convolution result, to obtain a feature image of (24, 24, 64) as an addition feature, wherein the down-sampling can be average pooling, that is, an average value of feature values of the feature image extracted by a pooling kernel is taken as a new feature value, for example, four feature points are extracted by a 2×2 pooling kernel, to obtain a corresponding feature value of (12, 13, 15, 16), and after performing average pooling, the four feature points are mapped into one feature point, so that a value of the one feature point is 14; in addition, the convolution result will be down-sampled again, to obtain a feature image of (48, 48, 128) taken as an input of a next convolution layer. Performing convolution calculation on the feature image of (48, 48, 128) twice sequentially through two convolution layers, to obtain corresponding convolution results, performing average pooling on the convolution results, to obtain a feature image of (24, 24, 128) taken as an addition feature, and performing down-sampling on the convolution result, to obtain a feature image of (24, 24, 256) taken as the input of the next convolution layer; performing convolution calculation on the feature image of (24, 24, 256) twice sequentially through the two convolution layers, to obtain corresponding convolution results, wherein the convolution result is the feature image of (24, 24, 256), the feature image of (24, 24, 256) is not only taken as the addition feature, but also taken as the input of the next convolution layer; the feature image of (24, 24, 256) is successively input into a transverse convolution layer and a longitudinal convolution layer for performing convolution calculation, to obtain the feature image of (24, 24, 256) taken as the addition feature. The size parameters of the license plate can be extracted from the transverse convolution layer and the longitudinal convolution layer, and taken as the verification feature to verify the license plate number feature. The convolution kernel in the transverse convolution layer is 11 multiplied by 1, the convolution kernel in the longitudinal convolution layer is 1 multiplied by 3, and a shape of the convolution kernel in the transverse convolution layer and the longitudinal convolution layer is related to a shape of the license plate.

Stacking the obtained addition features (24, 24, 64), (24, 24, 128), (24, 24, 256) and (24, 24, 256) in the channel dimension, to obtain a license plate number feature of (24, 24, 704), wherein the channel dimension of the license plate number feature is 704. Inputting the license plate number feature of (24, 24, 704) into the convolution layer for performing convolution calculation by the 3×3 convolution kernel, to obtain a license plate number feature of (24, 24, 16), wherein the channel dimension of the license plate number feature of (24, 24, 16) is 16. A feature vector is obtained by connecting the license plate number features through the fully connected layer, and the fully connected layer is configured to map a "distributed feature representation" that has been learned to a sample mark space, namely, a 16-dimensional vector is mapped to a 70-dimensional sample mark space for prediction. And finally, a license plate number result of (10, 1) is output through an output layer, wherein the number 10 includes characters, start-and-stop characters and alignment characters, and the number 1 is the number of results.

After the feature image of (24, 24, 256) is obtained, the feature image of (24, 24, 256) is taken as an input of the branch network to input into the branch network for extracting the verification feature, wherein the branch network can be a color classification network configured to perform color classification on the feature image of (24, 24, 256). The branch network outputs a type of color classification result taken as the color type of the verification feature, to verify the license plate number feature. Specifically, the corresponding license plate number can be predicted according to the license plate number feature, the license plate color corresponding to the license plate number is searched in the license plate number database and is taken as the color type of the license plate number, to determine whether the license plate number feature passes the verification, by determining whether the color type of the verification feature is the same as that of the license plate number.

In an embodiment of the present disclosure, the verification features are extracted through convolution results obtained by different network depths in the convolutional neural network, so that the verification feature and the license plate number feature can be extracted from the convolution result in one convolution neural, and the convolutional neural network is trained only by the same data set, thereby reducing difficulty of training the convolutional neural network and resources required by deployment. In addition, in the convolution process, a receptive field of the convolutional neural network is larger through performing a plurality of down-sampling operations, so that robustness of the neural network can be improved.

It should be noted that the license plate number recognition method provided in the embodiment of the present disclosure can be applied to devices such as mobile phones, monitors, computers and servers that need to recognize license plate numbers.

Figure 4:
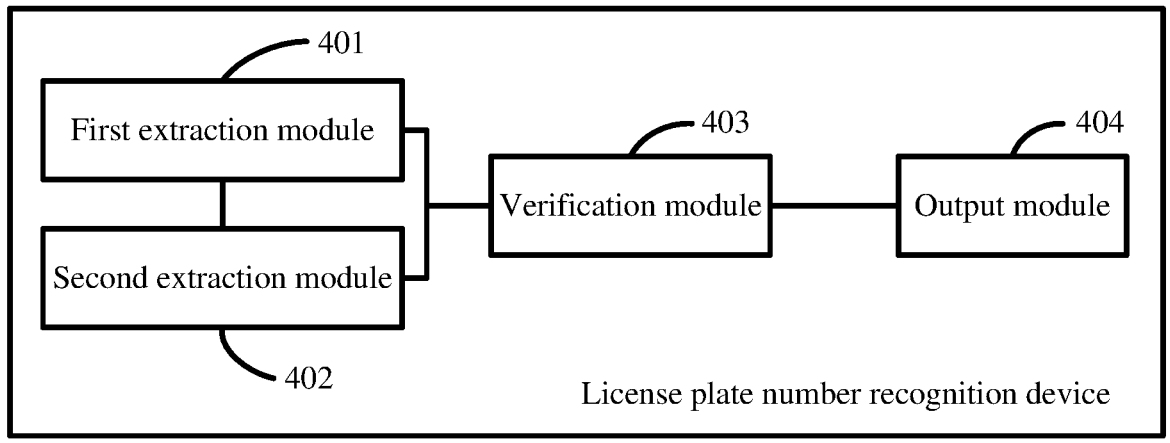
FIG. 4 is a block diagram of a license plate number recognition device in accordance with an embodiment of the present disclosure.

Referring to FIG. 4, a block diagram of a license plate number recognition device in accordance with an embodiment of the present disclosure is provided. The device includes:

a first extraction module 401 configured to extract a license plate number feature of an image to be recognized through a pre-trained convolutional neural network, the image to be recognized including a license plate number;

a second extraction module 402 configured to extract an intermediate convolution result during extracting the license plate number feature, and extract a first verification feature and/or a second verification feature, according to the intermediate convolution result;

a verification module 403 configured to verify whether the license plate number feature is correct, according to the first verification feature and/or the first verification feature; and an output module 404 configured to output a predicted license plate number result, according to the license plate number feature, if the license plate number feature is correct.

Figure 5:
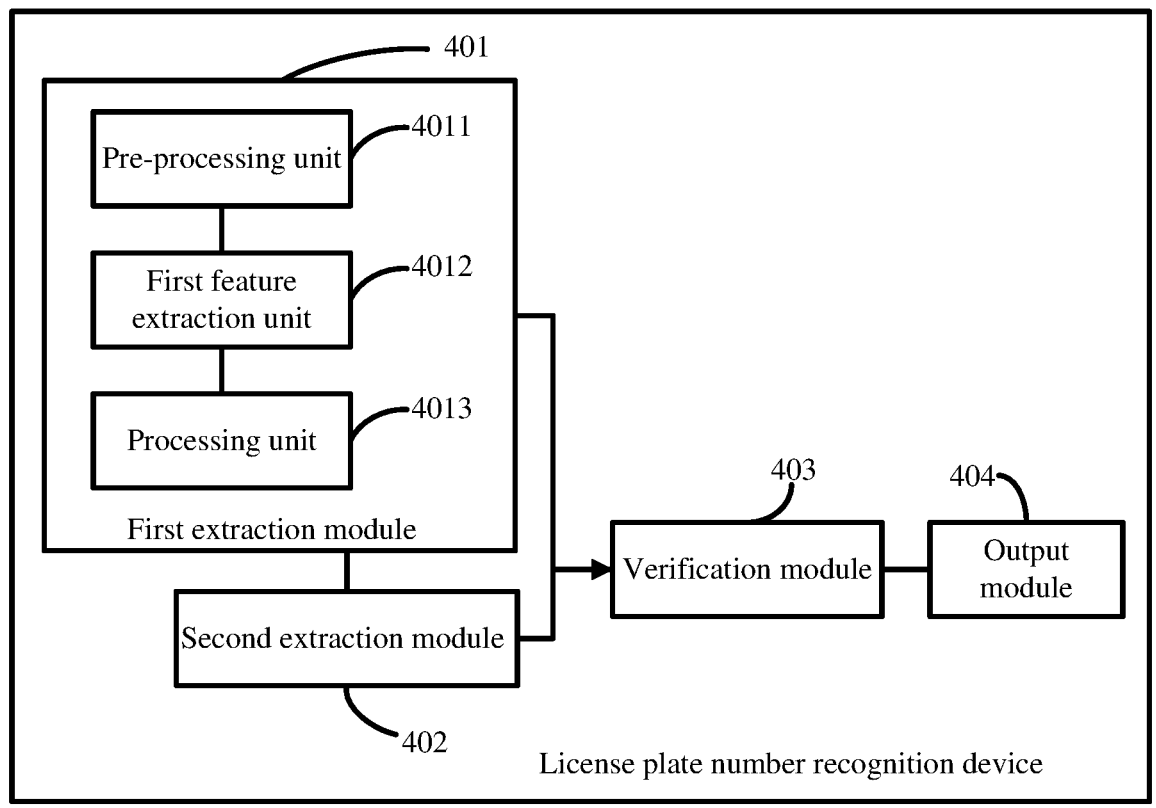
FIG. 5 is a block diagram of the license plate number recognition device in accordance with another embodiment of the present disclosure.

Referring to FIG. 5, the pre-trained convolutional neural network includes a first convolutional network and a second convolutional network, the first extraction module 401 includes:

a pre-processing unit 4011 configured to correct the image to be recognized through a spatial transformation network, to obtain the image to be recognized that has been corrected;

a first feature extraction unit 4012 configured to sequentially perform feature extraction on the image to be recognized that has been corrected through the first convolutional network and the second convolutional network, to sequentially obtain a first feature and a second feature with the same size, accordingly; and a processing unit 4013 configured to obtain the license plate number feature based on the first feature and the second feature.

Figure 6:
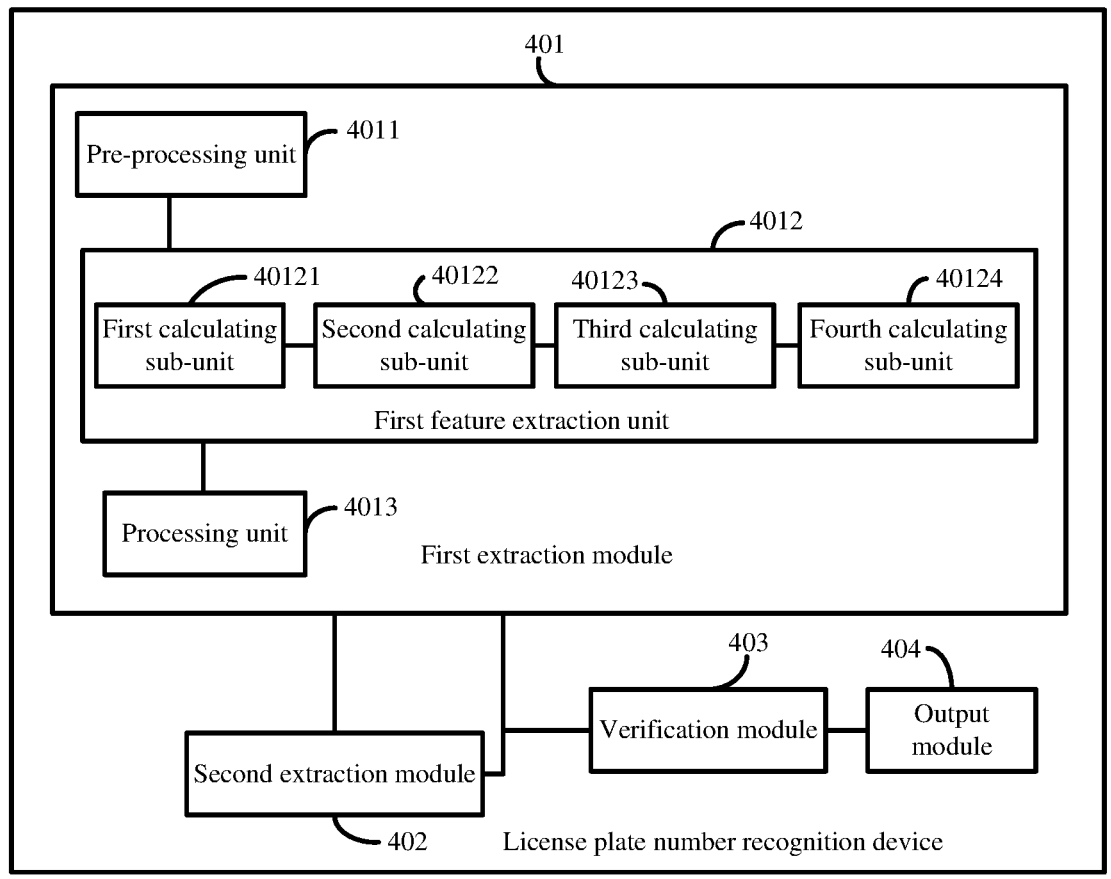
FIG. 6 is a block diagram of the license plate number recognition device in accordance with another embodiment of the present disclosure.

Referring to FIG. 6, the first convolutional network includes a first convolution layer, a second convolution layer, a third convolution layer, a first down-sampling layer, a second down-sampling layer, a third down-sampling layer, and a fourth down-sampling layer, and the second convolutional network includes a fourth convolution layer, inputs of the first down-sampling layer and the second down-sampling layer respectively connected to an output of a first convolution region. The first feature extraction unit 4012 includes:

a first calculating sub-unit 40121 configured to perform feature extraction on the image to be recognized that has been corrected through the first convolution layer, and perform down-sampling on a first convolution result through the first down-sampling layer, to obtain the first feature according with a target size;

a second calculating sub-unit 40122 configured to perform down-sampling on the first convolution result through the fourth down-sampling layer, perform feature extraction on a fourth down-sampling result through the second convolution layer, and perform down-sampling on a second convolution result through the second down-sampling layer, to obtain a third feature according with the target size;

a third calculating sub-unit 40123 configured to perform down-sampling on the second convolution result through the third down-sampling layer, to obtain a third down-sampling result according with the target size, and perform feature extraction on the third down-sampling result through the third convolution layer, to obtain a fourth feature based on a third convolution result;

a fourth calculating sub-unit 40124 configured to perform feature extraction on the fourth feature through a fourth convolutional network, to obtain the second feature based on a fourth convolution result; and wherein the target size is a size of the second feature.

Referring to FIG. 5, the processing unit 4013 is further configured to stack the first feature, the second feature, the third feature and the fourth feature on a channel dimension, to obtain the license plate number feature.

Figure 7:
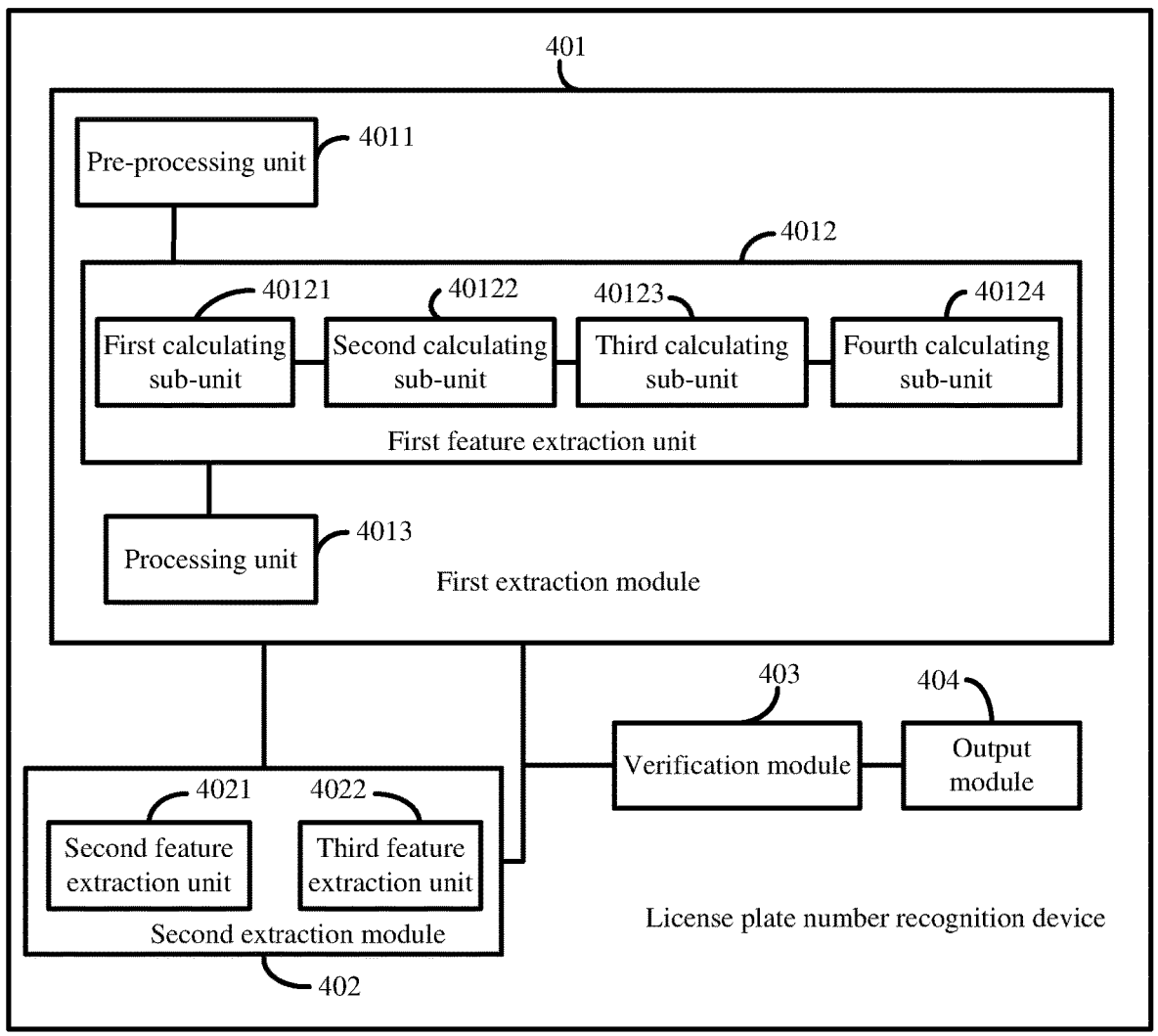
FIG. 7 is a block diagram of the license plate number recognition device in accordance with another embodiment of the present disclosure.

Referring to FIG. 7, the intermediate convolution result includes at least one of the first convolution result, the second convolution result, the third convolution result, and the fourth convolution result. The second extraction module 402 includes:

a second feature extraction unit 4021 configured to input any one of the first convolution result, the second convolution result and the third convolution result into a first verification network, to extract the first verification feature; and/or a third feature extraction unit 4022 configured to extract the second verification feature, according to the fourth convolution result.

Figure 8:
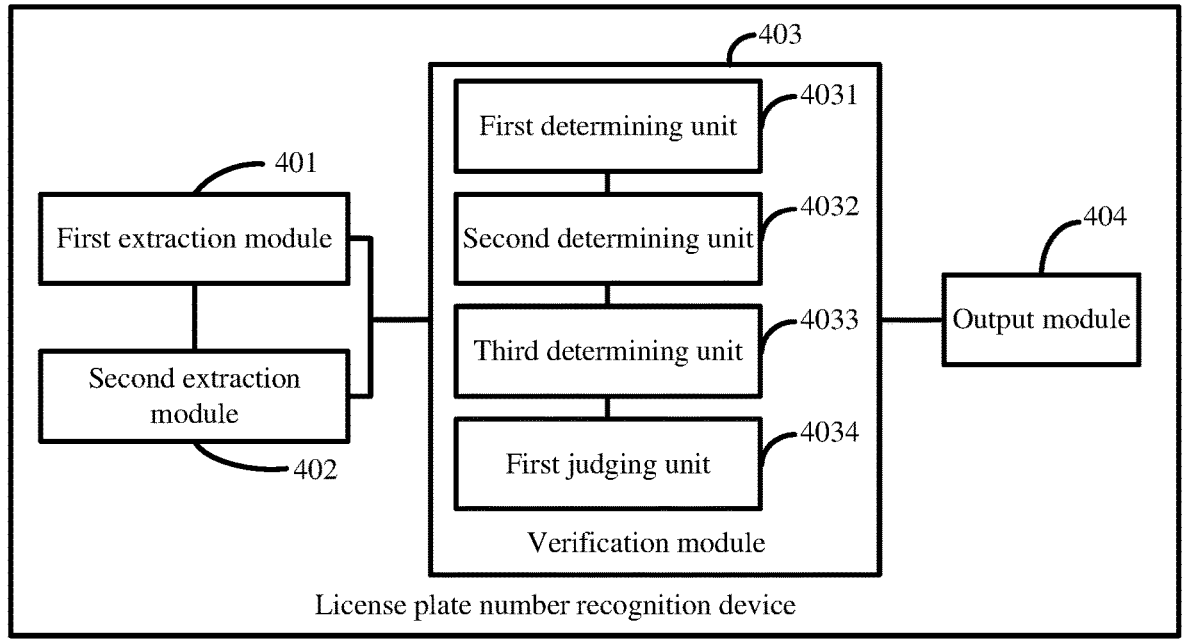
FIG. 8 is a block diagram of the license plate number recognition device in accordance with another embodiment of the present disclosure.

Referring to FIG. 8, the first verification feature is a color feature, and the verification module 403 includes:

a first determining unit 4031 configured to recognize the first verification feature, to determine a color type of the first verification feature;

a second determining unit 4032 configured to predict the license plate number feature, to determine a license plate type of the license plate number;

a third determining unit 4033 configured to determine the color type of the license plate number, according to the license plate type of the license plate number;

a first judging unit 4034 configured to determine whether the color type of the first verification feature is the same as that of the license plate number; if the color type of the first verification feature is the same as that of the license plate number, a verification result is passed; and if the color type of the first verification feature is different from that of the license plate number, the verification result is failed.

Figure 9:
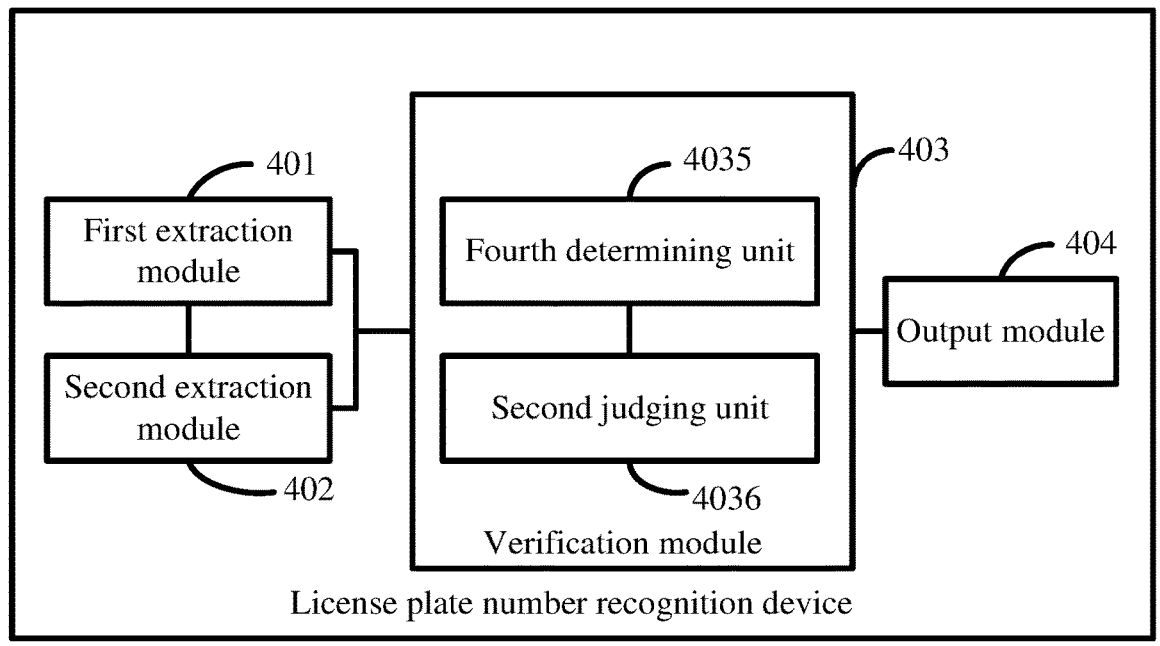
FIG. 9 is a block diagram of the license plate number recognition device in accordance with another embodiment of the present disclosure.

Referring to FIG. 9, the image to be recognized includes aspect ratio information of license plates, and the second verification feature is a size feature. The verification module 403 includes:

a fourth determining unit 4035 configured to recognize the second verification feature, to determine a size parameter corresponding to the second verification feature, and calculate a verification aspect ratio of the second verification feature, according to the size parameter;

a second judging unit 4036 configured to determine whether the verification aspect ratio of the second verification feature is the same as the aspect ratio of the license plate included in the image to be recognized; if the verification aspect ratio of the second verification feature is the same as the aspect ratio of the license plate included in the image to be recognized, the verification result is passed; and if the verification aspect ratio of the second verification feature is different from the aspect ratio of the license plate included in the image to be recognized, the verification result is failed.

It should be noted that the license plate number recognition device provided in the embodiment of the present disclosure can be applied to devices such as mobile phones, monitors, computers and servers that need to recognize license plate numbers.

The license plate number recognition device is provided in the embodiment of the present disclosure to implement steps of the license plate number recognition method of the present disclosure, to obtain the same technical effect, which will not be repeated here in order to avoid repeatedly describe the present disclosure.

Figure 10:
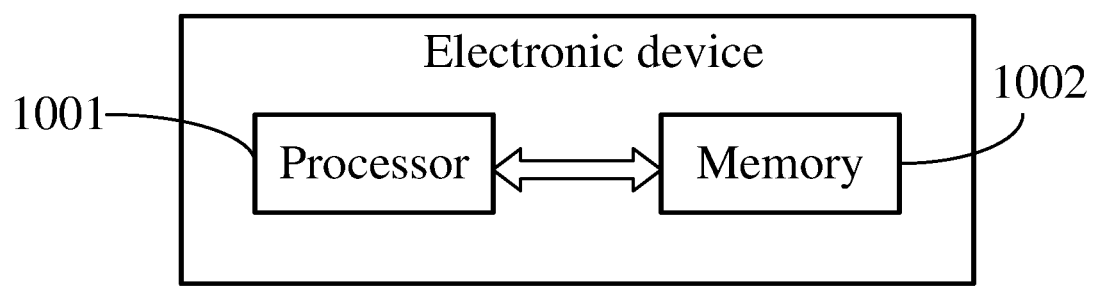
FIG. 10 is a block diagram of an electronic device in accordance with an embodiment of the present disclosure.

Referring to FIG. 10, a block diagram of an electronic device in accordance with an embodiment of the present disclosure is provided. The electronic device includes a memory 1002, a processor 1001 and computer programs stored in the memory 1002 and performed by the processor 1001.

The processor 1001 is configured to invoke the computer programs stored in the memory 1002, to perform the following steps:

extracting a license plate number feature of an image to be recognized through a pre-trained convolutional neural network, the image to be recognized including a license plate number;

extracting an intermediate convolution result during extracting the license plate number feature, and extracting a first verification feature and/or a second verification feature, according to the intermediate convolution result;

verifying the license plate number feature, according to the first verification feature and/or the first verification feature; and if the verification is passed, outputting a predicted license plate number result, according to the license plate number feature.

Optionally, the pre-trained convolutional neural network includes a first convolutional network and a second convolutional network, and the step of extracting, performed by the processor 1001, the license plate number feature of the image to be recognized through the pre-trained convolutional neural network, includes:

correcting the image to be recognized through a spatial transformation network, to obtain the image to be recognized that has been corrected;

sequentially performing feature extraction on the image to be recognized that has been corrected through the first convolutional network and the second convolutional network, to sequentially obtain a first feature and a second feature with the same size, accordingly; and obtaining the license plate number feature based on the first feature and the second feature.

Optionally, the first convolutional network includes a first convolution layer, a second convolution layer, a third convolution layer, a first down-sampling layer, a second down-sampling layer, a third down-sampling layer, and a fourth down-sampling layer, and the second convolutional network includes a fourth convolution layer, inputs of the first down-sampling layer and the second down-sampling layer respectively connected to an output of a first convolution region. The step of sequentially performing, by the processor 1001, feature extraction on the image to be recognized that has been corrected through the first convolutional network and the second convolutional network, to sequentially obtain the first feature and the second feature with the same size, accordingly, includes:

performing feature extraction on the image to be recognized that has been corrected through the first convolution layer, and performing down-sampling on a first convolution result through the first down-sampling layer, to obtain a first feature according with a target size;

performing down-sampling on the first convolution result through the fourth down-sampling layer, performing feature extraction on a fourth down-sampling result through the second convolution layer, and performing down-sampling on a second convolution result through the second down-sampling layer, to obtain a third feature according with the target size;

performing down-sampling on the second convolution result through the third down-sampling layer, to obtain a third down-sampling result according with the target size, and performing feature extraction on the third down-sampling result through the third convolution layer, to obtain a fourth feature based on a third convolution result;

performing feature extraction on the fourth feature through a fourth convolutional network, to obtain the second feature based on a fourth convolution result; and wherein the target size is a size of the second feature.

Optionally, the step, performed by the processor 1001, of obtaining the license plate number feature based on the first feature and the second feature, includes:

stacking the first feature, the second feature, the third feature and the fourth feature on a channel dimension, to obtain the license plate number feature.

Optionally, the intermediate convolution result includes at least one of the first convolution result, the second convolution result, the third convolution result, and the fourth convolution result, and the step, performed by the processor 1001, of extracting the intermediate convolution result in the process of extracting the license plate number feature, and extracting the first verification feature and/or the second verification feature, according to the intermediate convolution result, includes:

inputting any one of the first convolution result, the second convolution result and the third convolution result into a first verification network, to extract the first verification feature; and/or extracting the second verification feature, according to the fourth convolution result.

Optionally, the first verification feature is a color feature, and the step, performed by the processor 1001, of verifying the license plate number feature, according to the first verification feature, includes:

recognizing the first verification feature, to determine a color type of the first verification feature;

predicting the license plate number feature, to determine a license plate type of the license plate number;

determining the color type of the license plate number, according to the license plate type of the license plate number;

determining whether the color type of the first verification feature is the same as that of the license plate number;

if the color type of the first verification feature is the same as that of the license plate number, a verification result is passed; and if the color type of the first verification feature is different from that of the license plate number, the verification result is failed.

Optionally, the image to be recognized includes aspect ratio information of license plates, and the second verification feature is a size feature. The step, performed by the processor 1001, of verifying whether the license plate number feature is correct, according to the second verification feature, includes:

recognizing the second verification feature, to determine a size parameter corresponding to the second verification feature, and calculating a verification aspect ratio of the second verification feature, according to the size parameter;

determining whether the verification aspect ratio of the second verification feature is the same as the aspect ratio of the license plate included in the image to be recognized;

if the verification aspect ratio of the second verification feature is the same as the aspect ratio of the license plate included in the image to be recognized, the verification result is passed; and if the verification aspect ratio of the second verification feature is different from the aspect ratio of the license plate included in the image to be recognized, the verification result is failed.

It should be noted that the above electronic device of the present disclosure can be a mobile phone, a monitor, a computer, a server and other devices that can be applied to license plate number recognition.

The electronic device is provided in the embodiment of the present disclosure to implement steps of the license plate number recognition method of the present disclosure, to obtain the same technical effect, which will not be repeated here in order to avoid repeatedly describe the present disclosure.

A computer readable storage medium according to an embodiment of the present disclosure is configured to store computer programs performed by a processor to implement steps of the license plate number recognition method of the present disclosure, to obtain the same technical effect, which will not be repeated here in order to avoid repeatedly describe the present disclosure.

All or part of the steps in the method of the above embodiment in the present disclosure can be implemented by computer program instructions of relevant hardware which can be stored in a computer readable storage medium, when performing the computer program, the program can include flowcharts of the above embodiments of the methods. Furthermore, the storage medium can include: a diskette, a CD-ROM, a computer Memory, a Read-Only Memory (ROM), or a Random Access Memory (RAM).

What is claimed is:

1. A license plate number recognition method comprising:
extracting a license plate number feature of an image to be recognized through a pre-trained convolutional neural network, the image to be recognized comprising a license plate number;
extracting an intermediate convolution result during extracting the license plate number feature, and extracting a first verification feature and/or a second verification feature, according to the intermediate convolution result;
verifying whether the license plate number feature is correct, according to the first verification feature and/or the second verification feature; and
if the license plate number feature is correct, outputting a predicted license plate number result, according to the license plate number feature;
wherein the first verification feature is a color feature, and the step of verifying the license plate number feature, according to the first verification feature, comprises:
recognizing the first verification feature, to determine a color type of the first verification feature;
predicting the license plate number feature, to determine a license plate type of the license plate number;
determining the color type of the license plate number, according to the license plate type of the license plate number;
determining whether the color type of the first verification feature is the same as that of the license plate number;
if the color type of the first verification feature is the same as that of the license plate number, a verification result is passed; and
if the color type of the first verification feature is different from that of the license plate number, the verification result is failed.

2. The method as claimed in claim 1, wherein the pre-trained convolutional neural network comprises a first convolutional network and a second convolutional network, and the step of extracting the license plate number feature of the image to be recognized through the pre-trained convolutional neural network, comprises:
correcting the image to be recognized through a spatial transformation network, to obtain the image to be recognized that has been corrected;
sequentially performing feature extraction on the image to be recognized that has been corrected through the first convolutional network and the second convolutional network, to sequentially obtain a first feature and a second feature with the same size, accordingly; and
obtaining the license plate number feature based on the first feature and the second feature.

3. The method as claimed in claim 2, wherein the first convolutional network comprises a first convolution layer, a second convolution layer, a third convolution layer, a first down-sampling layer, a second down-sampling layer, a third down-sampling layer, and a fourth down-sampling layer, and the second convolutional network comprises a fourth convolution layer, inputs of the first down-sampling layer and the second down-sampling layer respectively connected to an output of a first convolution region, the step of sequentially performing feature extraction on the image to be recognized that has been corrected through the first convolutional network and the second convolutional network, to sequentially obtain the first feature and the second feature with the same size, accordingly, comprising:
performing feature extraction on the image to be recognized that has been corrected through the first convolution layer, and performing down-sampling on a first convolution result through the first down-sampling layer, to obtain the first feature according with a target size;
performing down-sampling on the first convolution result through the fourth down-sampling layer, performing feature extraction on a fourth down-sampling result through the second convolution layer, and performing down-sampling on a second convolution result through the second down-sampling layer, to obtain a third feature according with the target size;
performing down-sampling on the second convolution result through the third down-sampling layer, to obtain a third down-sampling result according with the target size, and performing feature extraction on the third down-sampling result through the third convolution layer, to obtain a fourth feature based on a third convolution result;
performing feature extraction on the fourth feature through a fourth convolutional network, to obtain the second feature based on a fourth convolution result; and wherein
the target size is a size of the second feature.

4. The method as claimed in claim 3, wherein the step of obtaining the license plate number feature based on the first feature and the second feature, comprises:
stacking the first feature, the second feature, the third feature and the fourth feature on a channel dimension, to obtain the license plate number feature.

5. The method as claimed in claim 3, wherein the intermediate convolution result comprises at least one of the first convolution result, the second convolution result, the third convolution result, and the fourth convolution result, wherein the step of extracting the intermediate convolution result during extracting the license plate number feature, and extracting the first verification feature and/or the second verification feature, according to the intermediate convolution result, comprises:
inputting any one of the first convolution result, the second convolution result and the third convolution result into a first verification network, to extract the first verification feature; and/or
extracting the second verification feature, according to the fourth convolution result.

6. The method as claimed in claim 1, wherein the image to be recognized comprises aspect ratio information of license plates, the second verification feature is a size feature, and the step of verifying whether the license plate number feature is correct, according to the second verification feature, comprises:
recognizing the second verification feature, to determine a size parameter corresponding to the second verification feature, and calculating a verification aspect ratio of the second verification feature, according to the size parameter;
determining whether the verification aspect ratio of the second verification feature is the same as the aspect ratio of the license plate included in the image to be recognized;
if the verification aspect ratio of the second verification feature is the same as the aspect ratio of the license plate included in the image to be recognized, a verification result is passed; and if the verification aspect ratio of the second verification feature is different from the aspect ratio of the license plate included in the image to be recognized, the verification result is failed.

7. A license plate number recognition device applied to an electronic apparatus, the electronic apparatus comprising a processor and a memory and one or more computerized program modules stored in the memory, the one or more computerized program modules comprising instructions performed by the processor of the electronic apparatus, the modules comprising:
   a first extraction module performed by the processor and configured to extract a license plate number feature of an image to be recognized through a pre-trained convolutional neural network, the image to be recognized comprising a license plate number;
   a second extraction module performed by the processor and configured to extract an intermediate convolution result during extracting the license plate number feature, and extract a first verification feature and/or a second verification feature, according to the intermediate convolution result;
   a verification module performed by the processor and configured to verify whether the license plate number feature is correct, according to the first verification feature and/or the second verification feature; and
   an output module performed by the processor and configured to output a predicted license plate number result, according to the license plate number feature, if the license plate number feature is correct;
   wherein the first verification feature is a color feature, and the verification module includes:
      a first determining unit performed by the processor and configured to recognize the first verification feature, to determine a color type of the first verification feature;
      a second determining unit performed by the processor and configured to predict the license plate number feature, to determine a license plate type of the license plate number;
      a third determining unit performed by the processor and configured to determine the color type of the license plate number, according to the license plate type of the license plate number;
      a first judging unit performed by the processor and configured to determine whether the color type of the first verification feature is the same as that of the license plate number; if the color type of the first verification feature is the same as that of the license plate number, a verification result is passed; and if the color type of the first verification feature is different from that of the license plate number, the verification result is failed.

8. The device as claimed in claim 7, wherein the pre-trained convolutional neural network includes a first convolutional network and a second convolutional network, the first extraction module comprises:
   a pre-processing unit performed by the processor and configured to correct the image to be recognized through a spatial transformation network, to obtain the image to be recognized that has been corrected;
   a first feature extraction unit performed by the processor and configured to sequentially perform feature extraction on the image to be recognized that has been corrected through the first convolutional network and the second convolutional network, to sequentially obtain a first feature and a second feature with the same size, accordingly; and
   a processing unit performed by the processor and configured to obtain the license plate number feature based on the first feature and the second feature.

9. The device as claimed in claim 8, wherein the first convolutional network includes a first convolution layer, a second convolution layer, a third convolution layer, a first down-sampling layer, a second down-sampling layer, a third down-sampling layer, and a fourth down-sampling layer, and the second convolutional network comprises a fourth convolution layer, inputs of the first down-sampling layer and the second down-sampling layer respectively connected to an output of a first convolution region, the first feature extraction unit comprises:
   a first calculating sub-unit performed by the processor and configured to perform feature extraction on the image to be recognized that has been corrected through the first convolution layer, and perform down-sampling on a first convolution result through the first down-sampling layer, to obtain the first feature according with a target size;
   a second calculating sub-unit performed by the processor and configured to perform down-sampling on the first convolution result through the fourth down-sampling layer, perform feature extraction on a fourth down-sampling result through the second convolution layer, and perform down-sampling on a second convolution result through the second down-sampling layer, to obtain a third feature according with the target size;
   a third calculating sub-unit performed by the processor and configured to perform down-sampling on the second convolution result through the third down-sampling layer, to obtain a third down-sampling result according with the target size, and perform feature extraction on the third down-sampling result through the third convolution layer, to obtain a fourth feature based on a third convolution result;
   a fourth calculating sub-unit performed by the processor and configured to perform feature extraction on the fourth feature through a fourth convolutional network, to obtain the second feature based on a fourth convolution result; and wherein the target size is a size of the second feature.

10. The device as claimed in claim 9, wherein the processing unit is further performed by the processor and configured to stack the first feature, the second feature, the third feature and the fourth feature on a channel dimension, to obtain the license plate number feature.

11. The device as claimed in claim 9, wherein the intermediate convolution result includes at least one of the first convolution result, the second convolution result, the third convolution result, and the fourth convolution result, the second extraction module comprises:
   a second feature extraction unit performed by the processor and configured to input any one of the first convolution result, the second convolution result and the third convolution result into a first verification network, to extract the first verification feature; and/or
   a third feature extraction unit performed by the processor and configured to extract the second verification feature, according to the fourth convolution result.

12. The device as claimed in claim 7, wherein the image to be recognized includes aspect ratio information of license plates, and the second verification feature is a size feature, the verification module comprises:

a fourth determining unit performed by the processor and configured to recognize the second verification feature, to determine a size parameter corresponding to the second verification feature, and calculate a verification aspect ratio of the second verification feature, according to the size parameter;

a second judging unit performed by the processor and configured to determine whether the verification aspect ratio of the second verification feature is the same as the aspect ratio of the license plate included in the image to be recognized; if the verification aspect ratio of the second verification feature is the same as the aspect ratio of the license plate included in the image to be recognized, the verification result is passed; and if the verification aspect ratio of the second verification feature is different from the aspect ratio of the license plate included in the image to be recognized, the verification result is failed.

13. An electronic device comprising a memory, a processor and computer programs stored in the memory and performed by the processor to implement steps of a license plate number recognition method, the method comprising:

extracting a license plate number feature of an image to be recognized through a pre-trained convolutional neural network, the image to be recognized comprising a license plate number;

extracting an intermediate convolution result during extracting the license plate number feature, and extracting a first verification feature and/or a second verification feature, according to the intermediate convolution result;

verifying whether the license plate number feature is correct, according to the first verification feature and/or the second verification feature; and if the license plate number feature is correct, outputting a predicted license plate number result, according to the license plate number feature;

wherein the first verification feature is a color feature, and the step of verifying the license plate number feature, according to the first verification feature, comprises:

recognizing the first verification feature, to determine a color type of the first verification feature;

predicting the license plate number feature, to determine a license plate type of the license plate number;

determining the color type of the license plate number, according to the license plate type of the license plate number;

determining whether the color type of the first verification feature is the same as that of the license plate number;

if the color type of the first verification feature is the same as that of the license plate number, a verification result is passed; and if the color type of the first verification feature is different from that of the license plate number, the verification result is failed.

* * * * *